United States Patent [19]

Dobson et al.

[11] Patent Number: 5,693,124
[45] Date of Patent: Dec. 2, 1997

[54] ACCUMULATOR DESICCANT BAG

[75] Inventors: Rodney L. Dobson, East Aurora; Peter J. Donnelly, Williamsville; Samuel A. Incorvia, North Tonawanda, all of N.Y.

[73] Assignee: Multisorb Technologies, Inc., Buffalo, N.Y.

[21] Appl. No.: 527,566

[22] Filed: Sep. 13, 1995

[51] Int. Cl.$^6$ ................................... B01D 53/04
[52] U.S. Cl. ..................... 96/147; 55/515; 62/503; 210/282
[58] Field of Search ................. 95/91, 90, 116, 95/117; 96/118, 136, 147, 148, 154; 55/512, 513, 515, 516, 517, 518, 519; 210/282; 62/503

[56] References Cited

U.S. PATENT DOCUMENTS

| | | | |
|---|---|---|---|
| 2,589,457 | 3/1952 | Touborg | 96/134 |
| 2,770,317 | 11/1956 | Bottum | 96/147 |
| 4,116,649 | 9/1978 | Cullen et al. | 96/147 |
| 4,291,548 | 9/1981 | Livesay | 62/503 |
| 4,401,447 | 8/1983 | Huber | 96/147 |
| 4,405,347 | 9/1983 | Cullen et al. | 55/515 |
| 4,457,843 | 7/1984 | Cullen et al. | 210/282 |
| 4,464,261 | 8/1984 | Cullen et al. | 210/282 |
| 4,474,035 | 10/1984 | Amin et al. | 62/503 |
| 4,505,727 | 3/1985 | Cullen et al. | 96/147 |
| 4,619,673 | 10/1986 | Cullen et al. | 55/387 |
| 4,911,739 | 3/1990 | Cullen et al. | 55/387 |
| 4,957,521 | 9/1990 | Cullen et al. | 55/515 |
| 4,994,185 | 2/1991 | Cullen et al. | 210/282 |
| 5,036,972 | 8/1991 | Cullen et al. | 206/204 |
| 5,119,616 | 6/1992 | Cullen et al. | 53/453 |
| 5,177,982 | 1/1993 | Plemens | 62/503 |

*Primary Examiner*—Duane S. Smith
*Attorney, Agent, or Firm*—Joseph P. Gastel

[57] ABSTRACT

A preformed desiccant bag for use with a retaining clip including a preformed porous casing including a first preformed bulbous end portion of a first girth and width, a second preformed bulbous end portion of a second girth and width, a central preformed waist portion of a third girth and width located between the first and second preformed bulbous end portions, with the third girth and width being smaller than either the first and second girths and the first and second widths to thereby provide a pronounced position for reception of a retaining clip, and desiccant in the casing.

37 Claims, 3 Drawing Sheets

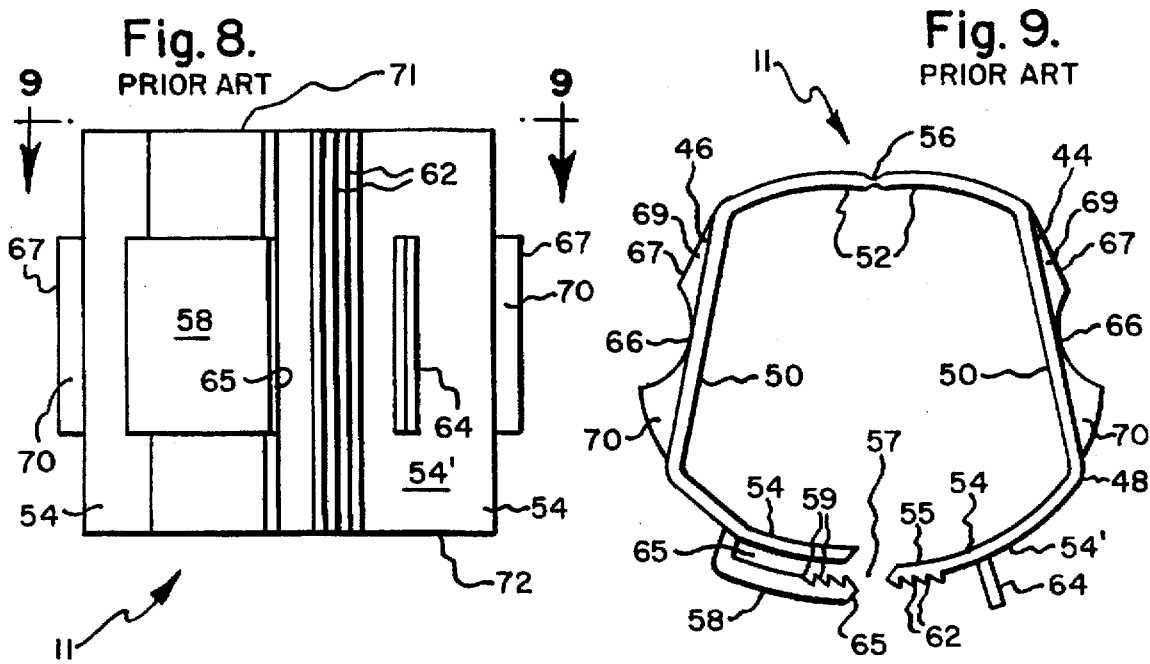
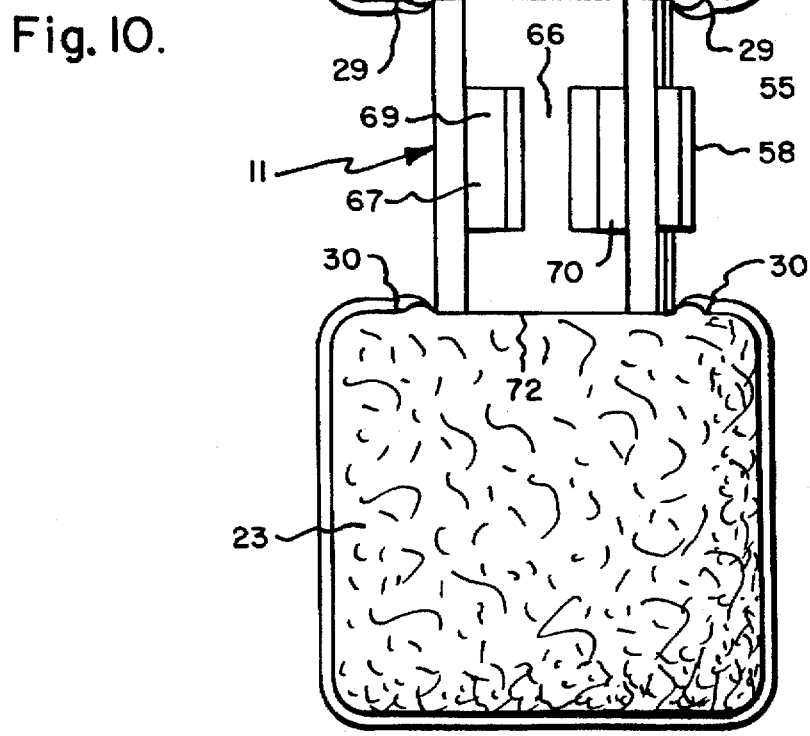

5,693,124

1

ACCUMULATOR DESICCANT BAG

BACKGROUND OF THE INVENTION

The present invention relates to an improved desiccant bag for use with a retaining clip which secures the bag within an U-bend tube of the accumulator of a refrigeration system.

By way of background, in U.S. Pat. No. 5,177,982, a retaining clip is disclosed for mounting a desiccant bag between the spaced tube portions of a U-bend tube of a refrigerant accumulator. However, the desiccant bag which it holds was originally of a generally uniform cross section. This leads to certain shortcomings. First of all, there is no defined location for mounting the retaining clip on the desiccant bag. Therefore, the operator who is mounting the clip onto the bag has to do so by eye. Since the retaining clip acts as a shield when the accumulator housing is being welded, if the clip is not placed in the proper location on the bag, it may not function to properly shield the bag from the welding heat. Additionally, since the bag is of uniform cross section, the upper portion of the bag can slip downwardly relative to the clip if the desiccant settles into the lower portion of the bag. Also, the possibility exists that the outward force produced by the prior bag will cause the mounted clip to pop open with the attendant possibility of the bag slipping out of the clip. It is with overcoming the foregoing deficiencies of the prior art that the present invention is concerned.

SUMMARY OF THE INVENTION

It is one object of the present invention to provide an improved preformed desiccant bag which has a preformed waist portion which is smaller than two preformed bulbous end portions so that a retaining clip can be positively located in the proper position on the bag.

Another object of the present invention is to provide an improved preformed desiccant bag which includes a planar wall which is to be placed against a vertical pipe within an accumulator, thereby insuring that when the foregoing relationship is effected, the desiccant bag is in proper position.

A further object of the present invention is to provide a preformed desiccant bag having a preformed lower end portion which will always contain a predetermined amount of desiccant which will be in the liquid phase of an accumulator, thereby assuring the desired moisture adsorption.

A still further object of the present invention is to provide an improved preformed desiccant bag which is of a shape which will mount on a bag without causing the bag to exert a force tending to pop the clip open. Other objects and attendant advantages of the present invention will readily be perceived hereafter.

The present invention relates to a preformed desiccant bag comprising a preformed porous casing, a first preformed bulbous end portion of a first girth on said casing, a second preformed bulbous end portion of a second girth on said casing, a preformed central waist portion of a third girth located between said first and second preformed bulbous end portions, said third girth being smaller than either said first and second girths, and desiccant in said casing.

The present invention also relates to a combination of a preformed desiccant bag and a clip: said preformed desiccant bag comprising a preformed porous casing, a first preformed bulbous end portion of a first girth on said casing, a second preformed bulbous end portion of a second girth on

2 said casing, a preformed central waist portion of a third girth located between said first and second preformed bulbous end portions, said third girth being smaller than either said first and second girths, and desiccant in said casing; and a clip mounted on said central waist portion, an upper edge on said clip located proximate said first preformed bulbous end portion, and a lower edge on said clip located proximate said second preformed bulbous end portion.

The present invention will be more fully understood when the following portions of the specification are read in conjunction with the accompanying drawings wherein:

BRIEF DESCRIPTION OF THE DRAWINGS

FIG. 8 is a side elevational view of the prior art clip which is used in conjunction with the improved desiccant bag;

FIG. 9 is a plan view taken substantially in the direction of arrows 9—9 of FIG. 8; and FIG. 10 is a front elevational view of the improved desiccant bag of the present invention with the prior art clip of FIGS. 8 and 9 mounted thereon.

DESCRIPTION OF THE PREFERRED EMBODIMENTS

Figure 1:
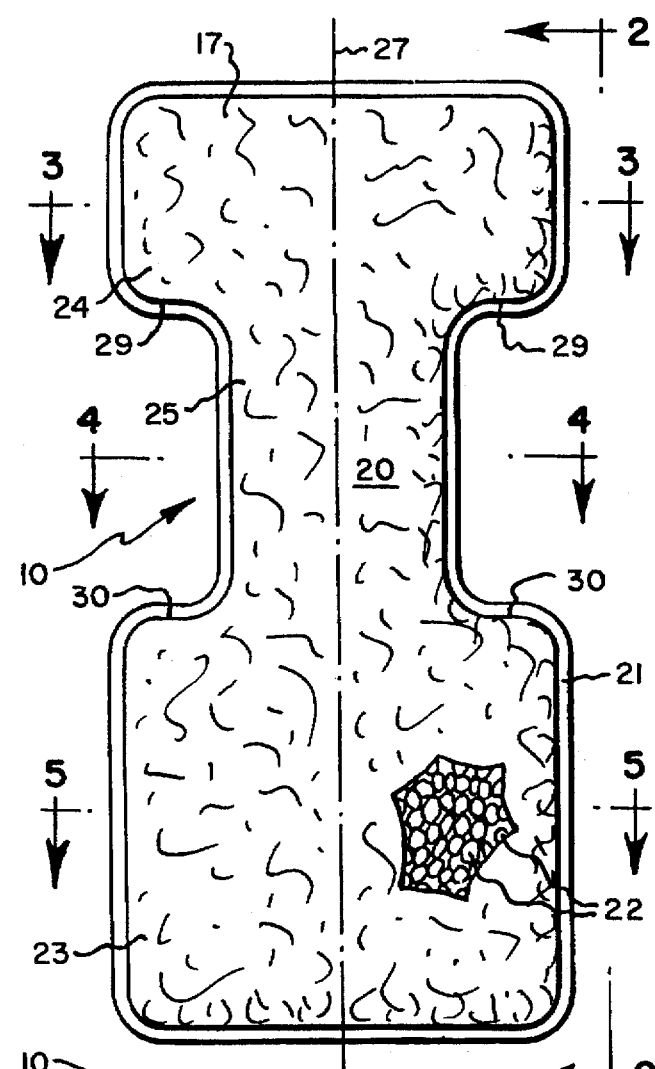
FIG. 1 is a front elevational view, partially broken away, of the improved desiccant bag of the present invention.
Figure 2:
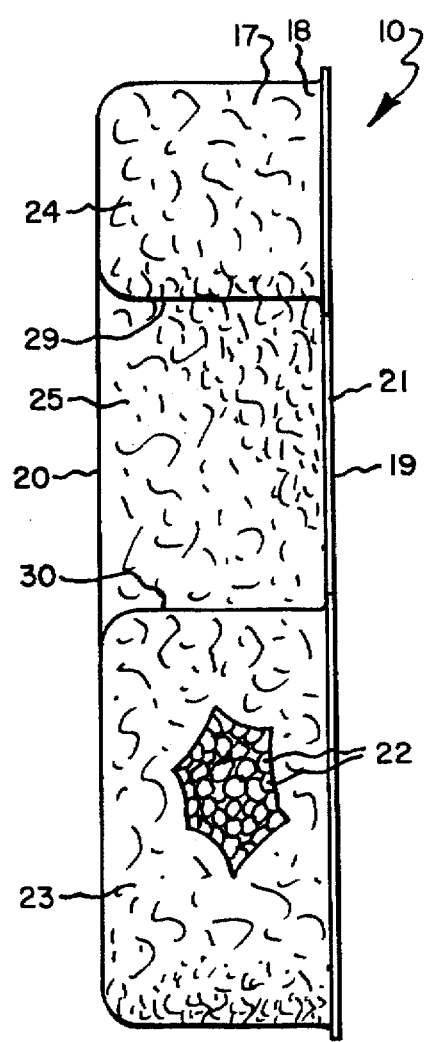
FIG. 2 is a side elevational view, partially broken away, taken substantially in the direction of arrows 2—2 of FIG. 1.
Figure 3:
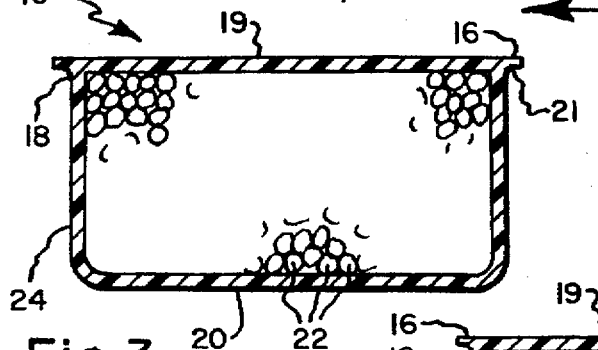
FIG. 3 is a cross sectional view taken substantially along line 3—3 of FIG. 1.
Figure 4:
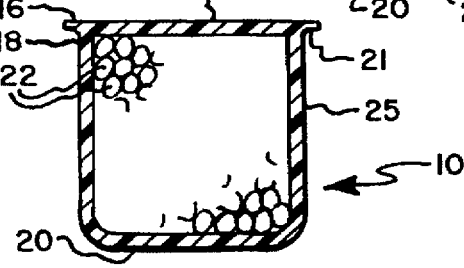
FIG. 4 is a cross sectional view taken substantially along line 4—4 of FIG. 1.
Figure 5:
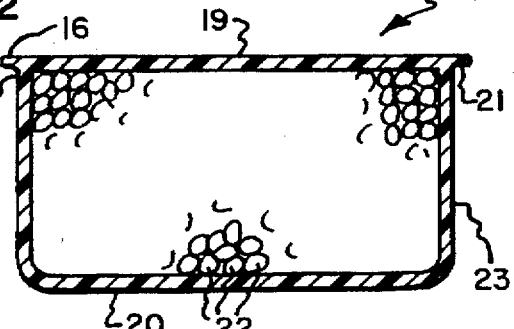
FIG. 5 is a cross sectional view taken substantially along line 5—5 of FIG. 1.

Summarizing in advance, the improved desiccant bag 10 of the present invention is utilized with prior art clip 11 in such a manner so that both are positively retained in position within the pipe portions 12 and 13 of U-shaped outlet tube 14 which is located within accumulator 15 of a conventional refrigeration system.

The improved desiccant bag 10 includes a preformed porous casing 17 which is fabricated of heat-fusible porous polyester material. Casing 17 includes a substantially planar porous polyester fabric wall 19 having an edge portion 16 which is bonded to the edge portion 18 of an irregularly-shaped trough-like preformed porous polyester wall 20 by means of a fused seam 21. Suitable desiccant 22, namely, molecular sieve in bead form is contained within casing 17. It will be appreciated, however, that the desiccant may be of any suitable type including but not limited to metal alumina silicate, alumina, calcium sulfate, activated charcoal or any other desired compound in bead, pellet or granular form depending on the circumstances of its use, as stated in prior art U.S. Pat. Nos. 5,177,982 and 4,619,673.

The desiccant bag 10 is fabricated by filling the irregularly-shaped trough-like preformed polyester wall 20 with desiccant and then bonding planar wall 19 to wall 20 at fused seam 21 by a technique known in the art. Thereafter, the casing 17 is heat-shrunk to cause it to fit snugly against the desiccant contained therein. The specific fabric of walls 19 and 20 is a commercially available polyester felt consisting of a blend of 3 denier and 6 denier fibers, not to exceed 25% 6 denier material, having a basis weight of 8.5–10.5 osy, a thickness of between about 0.060 and 0.070 inches, a minimum of 50 pounds tensile strength in the machine direction, a scrim air permeability of between about 45 and 85 and a minimum 270 pound Mullen burst. It will be appreciated, however, that any suitable porous fabric can be used. Also, if desired, the seam need not be fused, but can be sewn or formed in any suitable manner, especially if the fabric which is used is not heat-fusible. The heat-shrinking is a conventional procedure effected at a temperature which will provide the desired result, as is well known in the art.

The preformed casing 17 includes a lower bulbous end portion 23 which is connected to an upper bulbous end portion 24 by a central waist portion 25 which is of smaller girth and width than the girths and widths of either upper portion 24 and lower portion 23. Bulbous end portions 23 and 24 are of substantially solid rectangular configuration. The casing 17 is symmetrical about centerline 27, and lower bulbous end portion 23 has a longer dimension along centerline 27 than upper bulbous end portion 24, and the former contains more desiccant. However, it will be appreciated that the casing can depart from symmetry as possibly required for other environments. The lower bulbous end portion 23 is larger than the upper bulbous end portion 25 and consistently contains a proper amount of desiccant in the liquid phase portion of the accumulator 15. The upper bulbous end portion includes a pair of shoulders 29, and the lower bulbous end portion 23 includes a pair of shoulders 30, with shoulders 29 and 30 being adjacent to central waist portion 25.

The improved desiccant bag 10 of the present invention is intended to be mounted in a prior art accumulator 15 by means of a prior art clip 11 which is mounted on the central waist portion 25. The prior art accumulator 15 and the prior art clip 11 are fully disclosed in U.S. Pat. No. 5,177,982 which is incorporated herein by reference, particular attention being directed to the subject matter between column 3, line 55 and column 4, line 59. However, certain details of the prior art clip 11 and the prior art accumulator 15 will be described hereafter, insofar as it is necessary for a more complete understanding of the improved desiccant bag 10.

Figure 6:
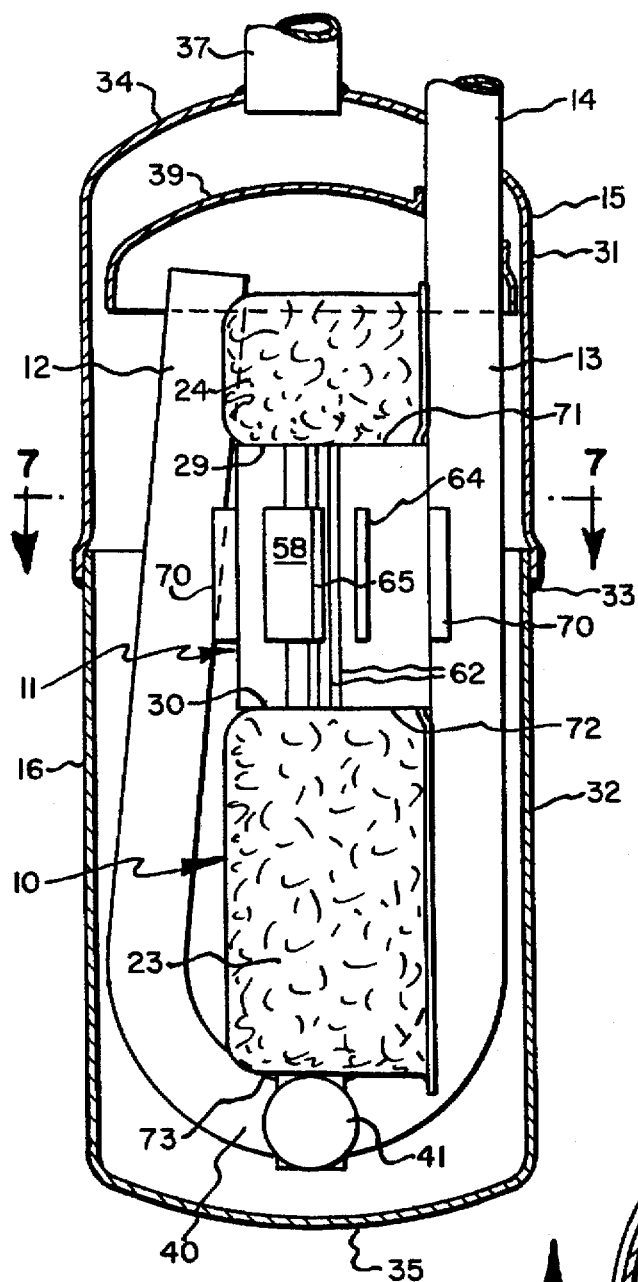
FIG. 6 is a cross sectional view taken substantially along line 6—6 of FIG. 7 and showing the improved desiccant bag mounted in an accumulator of a refrigeration system.

The prior art accumulator 15 in which the improved desiccant bag 10 is mounted includes a cylindrical housing having a cylindrical upper portion 31 which is joined to cylindrical lower portion 32 at a weld 33 which is abreast of the clip 11 so that the clip shields the installed bag 10 from the heat of welding. The accumulator 15 also includes a top wall 34 at its upper portion 31 and a bottom wall 35 at its lower portion 32. A refrigerant inlet tube 37 extends through top wall 34, and incoming refrigerant impinges on a baffle 39. The outlet tube 14 is of a U-bend construction which includes a vertical tube portion 13 and an inclined tube portion 12 which are connected to each other by a curved portion 40. As can be seen from FIG. 6, tube portions 12 and 13 diverge downwardly. A filter 41 is located in portion 40 and it is in communication with an aperture, not shown, in tube portion 40. All of the structure of an accumulator such as 15 is well known in the art, and the foregoing broad description is merely made for the sake of providing background information as well as completeness.

The improved desiccant bag 10 is retained in position by prior art clip 11 which is fully described in U.S. Pat. No. 5,177,982, which as noted above, is incorporated herein by reference. As stated in U.S. Pat. No. 5,177,982, and insofar as pertinent to the present desiccant bag 10, the retaining clip 11 surrounds the central waist portion 25 of desiccant bag 10, and it secures it between the downwardly diverging tube portions 12 and 13. The retaining clip 11 is essentially a jaw-like tubular plastic body member (FIGS. 8 and 9) including a first side wall 46 and a second side wall 48. The side walls 46 and 48 are generally arcuate members having planar base portions 50 and walls 52 extending transversely or generally perpendicularly from first ends of base portions 50 and walls 54 and 54' extending from opposite ends of walls 50. The side walls 46 and 48 are hingedly connected by a living hinge 56.

On the opposite side of the clip 11 from hinge 56 there is an opening 57 and a locking construction which closes the opening 57. The locking construction includes a tab 58 on wall 54, and tab 58 includes a plurality of teeth 59 which matingly engage teeth 62 on the other wall 54'. The end 55 of said other wall 54' enters the slot 65 when teeth 59 and 62 are in engagement when the clip 11 is located onto the waist portion 25 of desiccant bag 10. It will be appreciated that opening 57 is enlarged by pulling sides 54 apart about hinge 56, to mount clip 11 onto waist portion 25. A protuberance 64 on portion 54' can act as a stop for the end 65 of portion 58.

Figure 7:
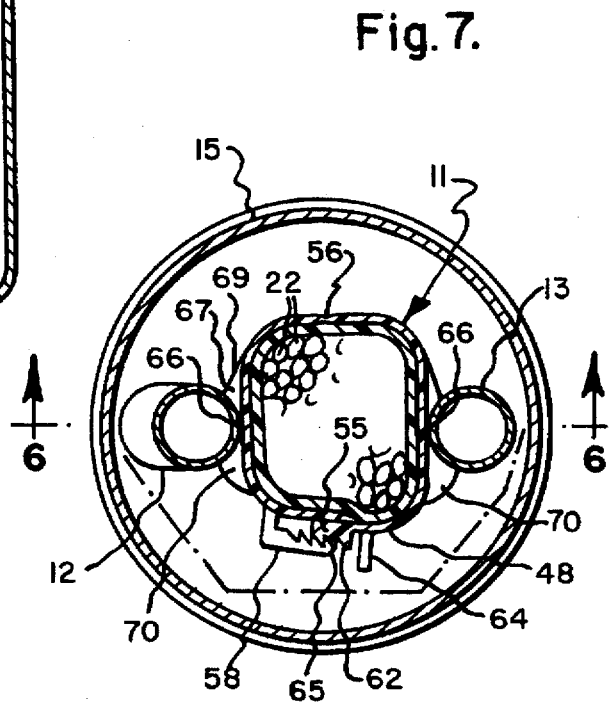
FIG. 7 is a cross sectional view taken substantially along line 7—7 of FIG. 6.

The retaining clip 11 includes diametrically opposed arcuate grooves 66 formed integrally with planar base portions 50. The grooves 66 matingly engage the insides of tube portions 12 and 13 (FIG. 7). As can be seen from FIG. 9, the grooves 66 are formed in protuberances 67 which includes portions 69 which are of a relatively slight slope and portions 70 which are of greater slope. When the clip 11 mounted on bag 10 is being slipped into position between tube portions 12 and 13, clip portions 67 of slight slope are moved between the tube portions 12 and 13 first to provide a camming action. After the clip 11 reaches the position where grooves 66 are abreast of tube portions 12 and 13, the normal resilience of the clip causes it to bear against tube portions 12 and 13. The clip and its retained desiccant bag 10 will thus be held securely between tube portions 12 and 13.

As can be seen from FIG. 8, the clip 11 has an upper edge 71 and a lower edge 72. Clip 11 and bag 10 are dimensioned relative to each other so that when the clip 11 is mounted on the central waist portion 25 of the bag, the upper edge 71 of the clip will be adjacent to and underlie shoulders 29 of bulbous end portion 24 of bag 10, and edge 72 of clip 11 will be adjacent to and overlie shoulders 30 of preformed bulbous end portion 23. Thus, the bag 10 is held against shifting longitudinally in both directions within clip 11. It is to be further noted that desiccant bag 10 is dimensioned so that its bottom edge 73 rests against the bend 40 of tube 14 and thus it is further held against sliding movement within clip 11. Since the bottom edge 73 rests against tube portion 40, and since the bottom edge 72 rests against shoulders 30, clip 10 is thus held against sliding downwardly between divergent tube portions 12 and 13. Also, as noted above, the smaller waist portion 25 of bag 10 positively positions the clip 11 on bag 10, and considering that the bottom edge 73 of the bag rests on tube portion 40, the clip is thus positioned abreast of weld 33. Additionally, it is to be noted that the planar wall 19 lies against the vertical pipe portion 13, thereby assuring a good fit of the bag 10 between pipe portions 12 and 13.

While preferred embodiments of the present invention have been disclosed, it will be appreciated that it is not limited thereto but may be otherwise embodied within the scope of the following claims.

What is claimed is:

1. A preformed desiccant bag comprising a preformed porous casing, a first preformed bulbous end portion of a first girth and first width on said casing, a second preformed bulbous end portion of a second girth and second width on said casing, a preformed central waist portion of a third girth and third width located between said first and second preformed bulbous end portions, said third girth and width being smaller than either said first and second girths and said first and second widths, and desiccant in said first and second preformed bulbous end portions and in said preformed central waist portion.

2. A preformed desiccant bag as set forth in claim 1 wherein said casing comprises a first wall having a first outer edge portion, a trough-shaped second wall having a second outer edge portion, and a seam joining said first and second edge portions.

3. A preformed desiccant bag as set forth in claim 2 wherein said first and second walls are formed of heat-fusible material, and wherein said seam comprises a fusion of said first and second edge portions.

4. A preformed desiccant bag as set forth in claim 2 wherein said first wall is substantially planar.

5. A preformed desiccant bag as set forth in claim 2 wherein said first and second walls are formed of heat-fusible material, and wherein said seam comprises a fusion of said first and second edge portions.

6. A preformed desiccant bag as set forth in claim 1 wherein said casing has a longitudinal axis, and wherein said first preformed bulbous end portion has a longer dimension lengthwise of said longitudinal axis than said second preformed bulbous end portion.

7. A preformed desiccant bag as set forth in claim 6 wherein said casing comprises a first wall having a first outer edge portion, a trough-shaped second wall having a second outer edge portion, and a seam joining said first and second edge portions.

8. A preformed desiccant bag as set forth in claim 7 wherein said first and second walls are formed of heat-fusible material, and wherein said seam comprises a fusion of said first and second edge portions.

9. A preformed desiccant bag as set forth in claim 7 wherein said first wall is substantially planar.

10. A preformed desiccant bag as set forth in claim 9 wherein said first and second walls are formed of heat-fusible material, and wherein said seam comprises a fusion of said first and second edge portions.

11. A preformed desiccant bag as set forth in claim 1 wherein said first and second preformed bulbous end portions are of substantially solid rectangular configuration.

12. A preformed desiccant bag as set forth in claim 11 wherein said casing comprises a first wall having a first outer edge portion, a trough-shaped second wall having a second outer edge portion, and a seam joining said first and second edge portions.

13. A preformed desiccant bag as set forth in claim 12 wherein said first and second walls are formed of heat-fusible material, and wherein said seam comprises a fusion of said first and second edge portions.

14. A preformed desiccant bag as set forth in claim 12 wherein said first wall is substantially planar.

15. A preformed desiccant bag as set forth in claim 14 wherein said first and second walls are formed of heat-fusible material, and wherein said seam comprises a fusion of said first and second edge portions.

16. A preformed desiccant bag as set forth in claim 15 wherein said casing has a longitudinal axis, and wherein said first preformed bulbous end portion has a longer dimension lengthwise of said longitudinal axis than said second preformed bulbous end portion.

17. A preformed desiccant bag as set forth in claim 11 wherein said casing has a longitudinal axis, and wherein said first preformed bulbous end portion has a longer dimension lengthwise of said longitudinal axis than said second preformed bulbous end portion.

18. A preformed desiccant bag as set forth in claim 17 wherein said casing comprises a first wall having a first outer edge portion, a trough-shaped second wall having a second outer edge portion, and a seam joining said first and second edge portions.

19. A preformed desiccant bag as set forth in claim 19 wherein said first and second walls are formed of heat-fusible material, and wherein said seam comprises a fusion of said first and second edge portions.

20. A preformed desiccant bag as set forth in claim 18 wherein said first wall is substantially planar.

21. A preformed desiccant bag as set forth in claim 1 wherein said first preformed bulbous end portion includes a first shoulder proximate one end of said central preformed waist portion, and wherein said second preformed bulbous end portion includes a second shoulder proximate the opposite end of said central preformed waist portion.

22. A preformed desiccant bag as set forth in claim 21 wherein said first and second shoulders are in facing relationship to each other.

23. A preformed desiccant bag as set forth in claim 1 wherein said preformed central waist portion has first and second ends, and wherein said first preformed bulbous end portion includes a first pair of shoulders proximate said first end of said central preformed waist portion, and wherein said second preformed bulbous end portion includes a second pair of shoulders proximate said second end of said central preformed waist portion in facing relationship to said first pair of first shoulders.

24. A preformed desiccant bag as set forth in claim 23 wherein said casing includes a longitudinal axis and wherein said casing is substantially symmetrical about said longitudinal axis.

25. A preformed desiccant bag as set forth in claim 24 wherein said casing comprises a first wall having a first outer edge portion, a trough-shaped second wall having a second outer edge portion, and a seam joining said first and second edge portions.

26. A preformed desiccant bag as set forth in claim 25 wherein said first and second walls are formed of heat-fusible material, and wherein said seam comprises a fusion of said first and second edge portions.

27. A preformed desiccant bag as set forth in claim 25 wherein said first wall is substantially planar.

28. A preformed desiccant bag as set forth in claim 27 wherein said first and second preformed bulbous end portions are of substantially solid rectangular configuration.

29. In combination: a preformed desiccant bag comprising a preformed porous casing, a first preformed bulbous end portion of a first girth and first width on said casing, a second preformed bulbous end portion of a second girth and second width on said casing, a preformed central waist portion of a third girth and third width located between said first and second preformed bulbous end portions, said third girth and third width being smaller than either said first and second girths and said first and second widths, and desiccant in said casing first and second preformed bulbous end portions and in said preformed central waist portion; and a clip mounted on said central waist portion, an upper edge on said clip located proximate said first preformed bulbous end portion, and a lower edge on said clip located proximate said second preformed bulbous end portion.

30. The combination as set forth in claim 29 including diametrically opposed grooves on said clip.

31. The combination as set forth in claim 30 including an opening in said clip through which said central waist portion is inserted into said clip.

32. The combination as set forth in claim 29 including a first shoulder on said first preformed bulbous end portion located proximate said upper edge of said clip, and a second shoulder on said second preformed bulbous end portion located proximate said lower edge of said clip.

33. The combination as set forth in claim 29 wherein said preformed central waist portion has first and second ends, and said first preformed bulbous end portion has a first pair of shoulders proximate said first end of said central preformed waist portion, and wherein said second preformed bulbous end portion has a second pair of shoulders proximate said second end of said central preformed waist portion in facing relationship to said first pair of first shoulders.

34. A preformed desiccant bag comprising a preformed porous casing, a first preformed bulbous end portion of a first girth and first width on said casing, a second preformed bulbous end portion of a second girth and second width on said casing, a central waist portion of a third girth and third width located between said first and second preformed bulbous end portions, said third girth and third width being smaller than either said first and second girths and said first and second widths, and desiccant in said first and second preformed bulbous end portions and in said central waist portion.

35. A preformed desiccant bag as set forth in claim 34 wherein said first preformed bulbous end portion includes a first shoulder proximate one end of said central waist portion, and wherein said second preformed bulbous end portion includes a second shoulder proximate the opposite end of said central waist portion.

36. A preformed desiccant bag comprising a preformed porous casing, a first preformed bulbous end portion of a first girth on said casing, a second preformed bulbous end portion of a second girth on said casing, a preformed central waist portion of a third girth located between said first and second preformed bulbous end portions, said third girth being smaller than either said first and second girths, desiccant in said casing, and said first and second preformed bulbous end portions being of substantially solid rectangular configuration.

37. A preformed desiccant bag comprising a preformed porous casing, a first preformed bulbous end portion of a first girth on said casing, a second preformed bulbous end portion of a second girth on said casing, a preformed central waist portion of a third girth located between said first and second preformed bulbous end portions, said third girth being smaller than either said first and second girths, desiccant in said casing, said first preformed bulbous end portion including a first shoulder proximate one end of said central preformed waist portion, said second preformed bulbous end portion including a second shoulder proximate the opposite end of said central preformed waist portion, and said first and second shoulders being substantially perpendicular to said central preformed waist portion.

* * * * *

UNITED STATES PATENT AND TRADEMARK OFFICE
CERTIFICATE OF CORRECTION

PATENT NO. : 5,693,124
DATED : December 2, 1997
INVENTOR(S) : Rodney L. Dobson et al It is certified that error appears in the above-indentified patent and that said Letters Patent is hereby corrected as shown below:

Column 6, line 14 (claim 19), change "claim 19" to --claim 18--.

Column 6, line 65 (claim 29), delete "casing".

Signed and Sealed this

Tenth Day of February, 1998

Attest:

BRUCE LEHMAN

Attesting Officer

Commissioner of Patents and Trademarks